(12) United States Patent
Barnes (10) Patent No.: US 11,439,928 B2
(45) Date of Patent: Sep. 13, 2022

(54) ELECTROTHERMAL SHAKER FOR ELECTROSEPARATION OF SOLIDS WITHIN DRILLING FLUID

(71) Applicant: HALLIBURTON ENERGY SERVICES, INC., Houston, TX (US)

(72) Inventor: Zachary D. Barnes, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 284 days.

(21) Appl. No.: 16/488,296

(22) PCT Filed: Nov. 15, 2018

(86) PCT No.: PCT/US2018/061248
§ 371 (c)(1),
(2) Date: Aug. 23, 2019

(87) PCT Pub. No.: WO2020/101684
PCT Pub. Date: May 22, 2020

(65) Prior Publication Data
US 2021/0154600 A1 May 27, 2021

(51) Int. Cl.
| | |
|---|---|
| *B01D 21/00* | (2006.01) |
| *B01D 21/28* | (2006.01) |
| *C02F 1/34* | (2006.01) |
| *C02F 1/463* | (2006.01) |
| *C02F 1/469* | (2006.01) |
| *C02F 1/48* | (2006.01) |
| *E21B 21/06* | (2006.01) |
| *C02F 103/10* | (2006.01) |

(52) U.S. Cl.
CPC ..... *B01D 21/0009* (2013.01); *B01D 21/0012* (2013.01); *B01D 21/283* (2013.01); *C02F 1/34* (2013.01); *C02F 1/463* (2013.01); *C02F 1/4696* (2013.01); *C02F 1/484* (2013.01); *E21B 21/065* (2013.01); *C02F 2103/10* (2013.01)

(58) Field of Classification Search
None
See application file for complete search history.

(56) References Cited

U.S. PATENT DOCUMENTS

| | | | |
|---|---|---|---|
| 4,323,445 A | 4/1982 | Alekhin et al. | |
| 9,023,275 B2 | 5/2015 | McClung, III | |
| 9,033,156 B2 | 5/2015 | Burkhard | |
| 9,221,063 B2 | 12/2015 | Frisky et al. | |
| 2001/0050255 A1* | 12/2001 | Barrett | C22B 11/042 210/710 |
| 2003/0136686 A1* | 7/2003 | Herbst | C02F 1/463 205/751 |

(Continued)

OTHER PUBLICATIONS

International Search Report and Written Opinion, PCT/US2018/061248, dated Aug. 6, 2019, 14 pages, ISA/KR.

*Primary Examiner* — Richard C Gurtowski
(74) *Attorney, Agent, or Firm* — Haynes and Boone, LLP (57) ABSTRACT

A method of removing solids from a drilling fluid that includes applying a first electric current to a first screen of a screen assembly within a vibratory screening machine; passing the drilling fluid through the screen assembly while the first electric current is applied to allow electroseparation of solids within the drilling fluid; and removing electroseparated solids from the drilling fluid.

19 Claims, 5 Drawing Sheets

(56) References Cited

U.S. PATENT DOCUMENTS

| | | |
|---|---|---|
| 2007/0235336 A1 | 10/2007 | Carrier et al. |
| 2009/0283454 A1 | 11/2009 | Scott et al. |
| 2010/0224497 A1* | 9/2010 | Livshits ................ C02F 1/4678 205/750 |
| 2012/0222854 A1 | 9/2012 | McClung, III |
| 2017/0283705 A1 | 10/2017 | Hunter |

* cited by examiner

ELECTROTHERMAL SHAKER FOR ELECTROSEPARATION OF SOLIDS WITHIN DRILLING FLUID

CROSS-REFERENCE TO RELATED APPLICATION

The present application is a U.S. National Stage patent application of International Patent Application No. PCT/US2018/061248, filed on Nov. 15, 2018, the benefit of which is claimed and the disclosure of which is incorporated herein by reference in its entirety.

TECHNICAL FIELD

The present disclosure relates generally to vibratory screening machines used to filter solids such as low gravity solids from liquids. More particularly, the disclosure relates to an electrothermal vibratory screening machine used in the oil and gas industry.

BACKGROUND

In drilling oil and gas wells, drilling fluids are used to lubricate and cool the drill bit and convey drilled cuttings or solids away from the bore hole. These fluids, also called muds, are a mixture of various chemicals in a water- or oil-based solution and can be expensive to make. Moreover, some of the drilled cuttings or solids may be metallic or semi-metallic, which can damage tools or be determinantal to drilling operations if allowed to remain in the mud.

Vibratory screening machines or shale shakers are the preliminary systems used to separate the solids from the liquids. After returning to the surface of the well, the used drilling fluid flows directly to the shale shakers where it begins to be processed. Once processed by the shale shakers the drilling fluid flows to other solid control equipment (e.g., centrifuge) to remove the finer solids, including some of the metallic or semi-metallic solids, from it. The solids removed by the shale shaker are discharged out of the discharge port into a separate holding tank where they await further treatment or disposal. However, some of the finer solids may remain in the liquids even after passing through the screening machines and the other solid control equipment. Fine solids remaining in the drilling fluid recycled as described is disadvantageous for a drilling operation.

DETAILED DESCRIPTION

Generally, this disclosure is directed to a shaker assembly configured to remove low gravity solids via electroseparation. Utilizing electric currents applied to or through different layers of a multilayered shaker screen, low gravity solids are removed from returned drilling fluids at the shaker. Separate shaker screens layers may be configured as electrodes such that the shaker screen may act as a surface for electroseparation, including electrophoresis, electromagnetic attraction, or electrocoagulation, of low gravity solids. Additionally, the returned drilling fluid may be heated thereby reducing viscosity and initiating the removal of drilling fluid from the cuttings.

Generally, each layer or element of a screen assembly of the shaker has a screen or filter media with decreasing size (diameter) passages for solid materials. In some applications composite or coated materials are utilized. In one embodiment, the screen assembly has a 3-layer, 3-element, or 3-zone screen configuration. The screen assembly is configured to have a metallic or conductive first (top) screen element, a composite or coated non-conductive material as the second (middle) screen element, and a third (bottom) screen element that is also metallic or conductive. Additionally, the first and third screen elements may be constructed of a material that emits heat when a current is applied.

The shaker screens will be mounted to the vibratory assembly of the shaker in a manner that allows for delivery of an electrical current to one or more of the screens. Often, there are multiple shaker screens positioned adjacent to each other, often in parallel and sequential configurations. These are retained on the vibratory assembly by clamping or tensioning mechanisms that are activated by electrical, hydraulic, pneumatic, or mechanical systems. Delivery of the electrical current supplied to the first element may be for example by a screen clamping, a tensioning, or a plug mechanism (e.g. a jack plug). Likewise, the opposite electrical current may be supplied to the lower surface of a shaker screen, for example by a supporting, a tensioning, or plug mechanism.

Figure 1:
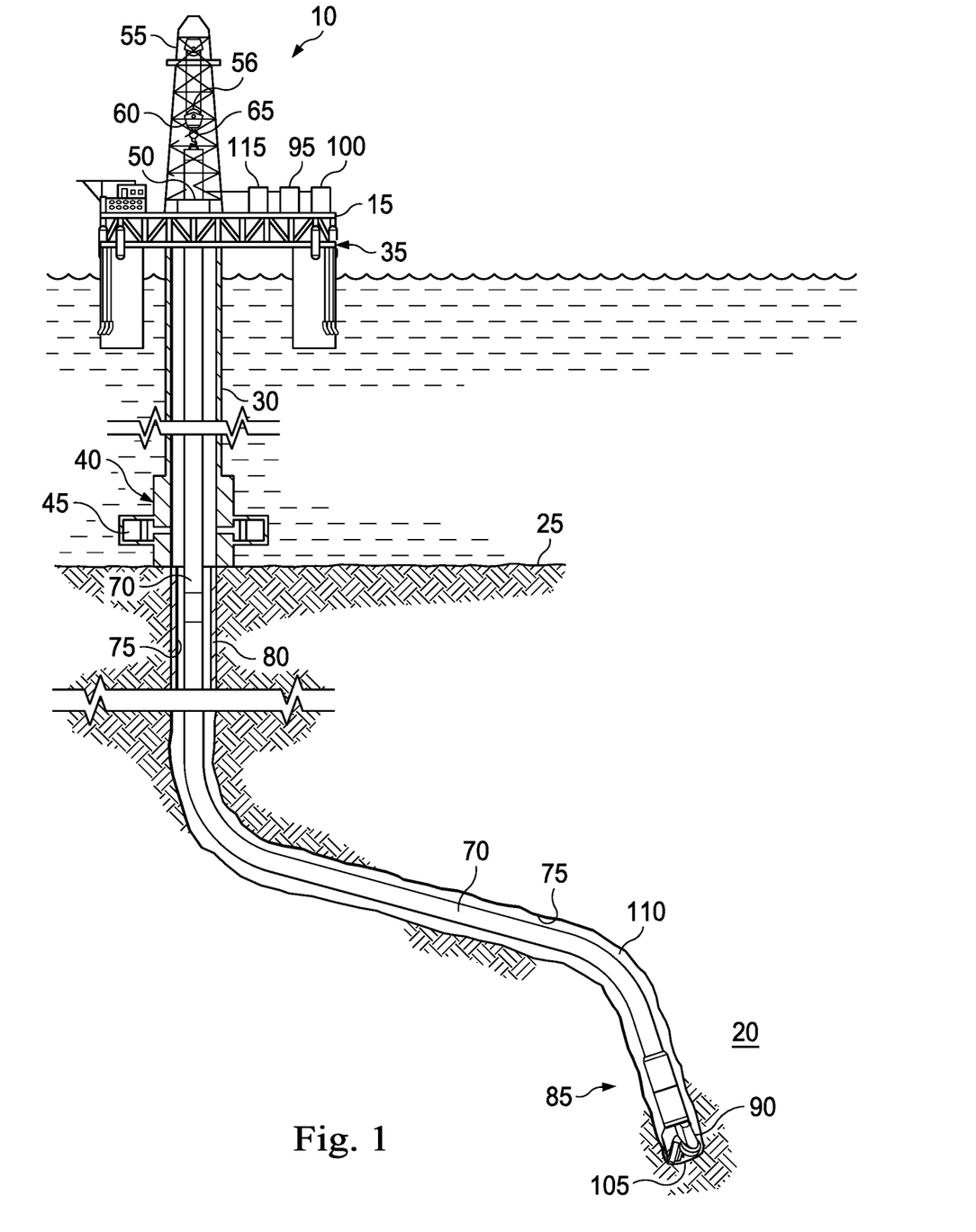
FIG. 1 is a schematic illustration of an offshore drilling apparatus including a vibratory screening machine, according to an example embodiment.

Referring initially to FIG. 1, a bottom hole assembly extends from an offshore oil or gas platform that is schematically illustrated and generally designated 10. A semi-submersible platform 15 is positioned over a submerged oil and gas formation 20 located below a sea floor 25. A subsea conduit 30 extends from a deck 35 of the platform 15 to a subsea wellhead installation 40, including blowout preventers 45. The platform 15 has a hoisting apparatus 50, a derrick 55, a travel block 56, a hook 60, and a swivel 65 for raising and lowering pipe strings, such as a substantially tubular, axially extending tubing string 70.

It should be understood by those skilled in the art that the use of directional terms such as "above," "below," "upper," "lower," "upward," "downward," "uphole," "downhole" and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Also, even though FIG. 1 depicts an offshore operation, it should be understood by those skilled in the art that the apparatus according to the present disclosure is equally well suited for use in onshore operations.

A wellbore 75 extends through the various earth strata including the formation 20 and has a casing string 80 at least partially cemented therein. The lower end of the drill string 70 may include a bottom hole assembly 85, which may carry at a distal end a rotary drill bit 90. Drilling fluid or "mud" may be pumped from a fluid reservoir 95 by a mud pump 100 to the upper end of the drill string 70 and flow through the longitudinal interior of the drill string 70, through the bottom hole assembly 85, and exit from nozzles formed in the rotary drill bit 90. At bottom end 105 of the wellbore 75, the drilling fluid may mix with formation cuttings and other drilling fluids and debris. The drilling fluid mixture may then flow upwardly through an annulus 110 to return formation cuttings and other downhole debris to the surface.

The drilling fluid mixture or slurry flows to a slurry treatment system including a shale shaker 115 having screens to be described below. The shale shaker 115 separates a portion of any cuttings and solids from the liquid. The liquid may be further treated in the slurry treatment system to separate water, oil, and non-gas liquid hydrocarbons. The output of the slurry treatment system, i.e., drilling fluid, flows through into the fluid reservoir 95 for reuse.

The present disclosure relates generally to a vibratory screening machine, or the shale shaker 115, used to filter solids from liquids. More particularly, the disclosure relates to an electrothermal vibratory screening machine used in the oil and gas industry. Generally, the shale shaker 115 removes low gravity solids from the drilling fluid, a deficiency in the current configurations of similar devices. However, in some embodiments, the fluid is not a drilling fluid but is a treatment fluid. In some embodiments, a low gravity solid is a solid having a lower density than the barite or hematite that is used to weight up the drilling fluid. In some embodiments, the low gravity solids have a density equal to or less than 4.40 $g/cm^3$ and some with a density equal to or less than 2.60 $g/cm^3$. In some embodiments, the shale shaker 115 is configured to remove low gravity solids that are metallic or semi-metallic.

Figure 2:
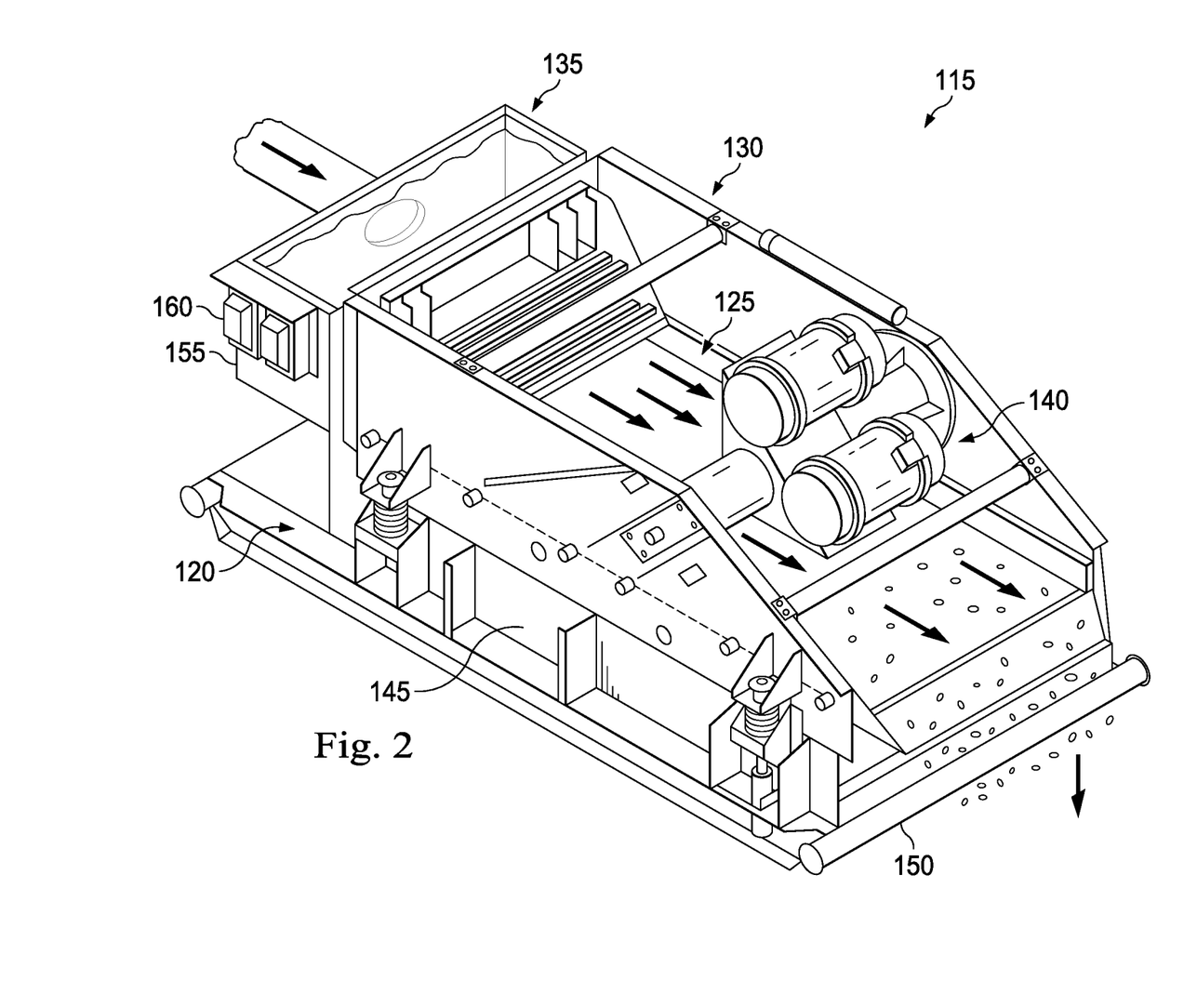
FIG. 2 is a perspective view of the vibratory screening machine of FIG. 1, according to an example embodiment.
Figure 3:
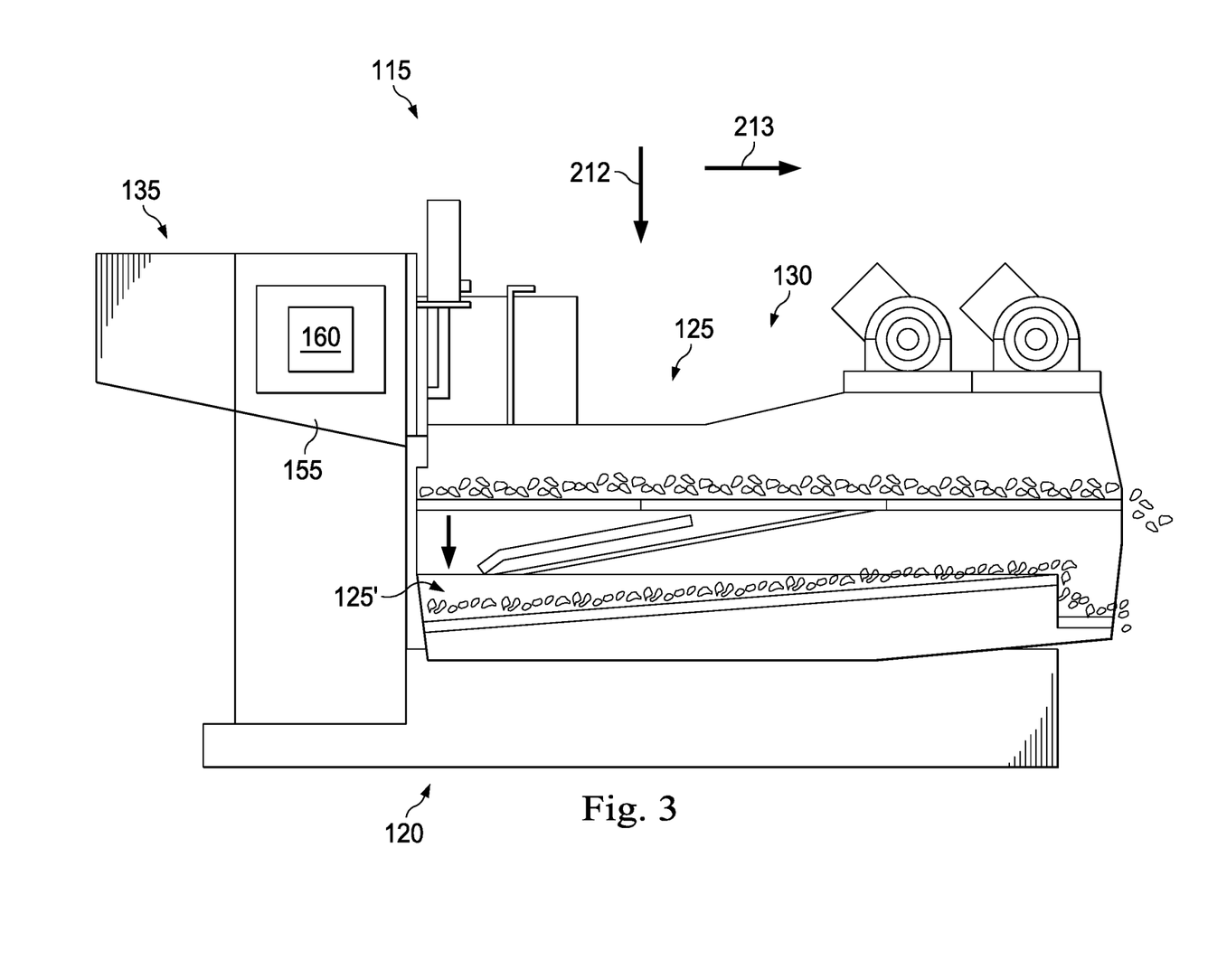
FIG. 3 is a cross-sectional view of the vibratory screening machine of FIG. 2, according to an example embodiment.

As illustrated in FIG. 2 and/or FIG. 3, the shale shaker 115 includes a shaker base assembly 120, which provides a base in which a screen panel assembly 125, a screen panel assembly 125', a shaker basket assembly 130, and a feed box assembly 135 sit. Drilling fluid mixture is fed into the feed box assembly 135, which goes into the shaker basket assembly 130. The shaker basket assembly 130 contains the screen panel assembly 125, which serves as a filter for the drilling fluid mixture. A vibrating assembly 140 provides shaking motion to the shaker basket assembly 130. Solids in the drilling fluid mixture are separated or strained out after the drilling fluid mixture passes through screen assembly 125. The strained drilling fluid is accommodated with one or more return pits 145. Generally, solids removed from the drilling fluid mixture travel forward on top of the screen assembly 125 and are discharged over a discharge skirt 150. However, in some embodiments, the low gravity solids are retained by the screen panel assembly 125 and are not discharged over the discharge skirt 150. While two screen panel assemblies are illustrated in FIG. 3, the shale shaker 115 may include any number of screen panel assemblies. In some embodiments, the screen panel assemblies 125 and 125' are generally similar, but 125' may be configured to screen smaller sized cuttings than the screen panel assembly 125.

In one embodiment of the present disclosure, the screen panel assembly 125 is installed and removed by hand. In another embodiment, however, the shale shaker 115 includes an automated placement and tensioning system to install, seat, and tension the screen panel assembly 125 in the shaker basket assembly 130. A control panel support stand 155 is mounted to the side of the shaker 115. An electrical control panel 160 is attached to the control panel support stand 155.

Figure 4:
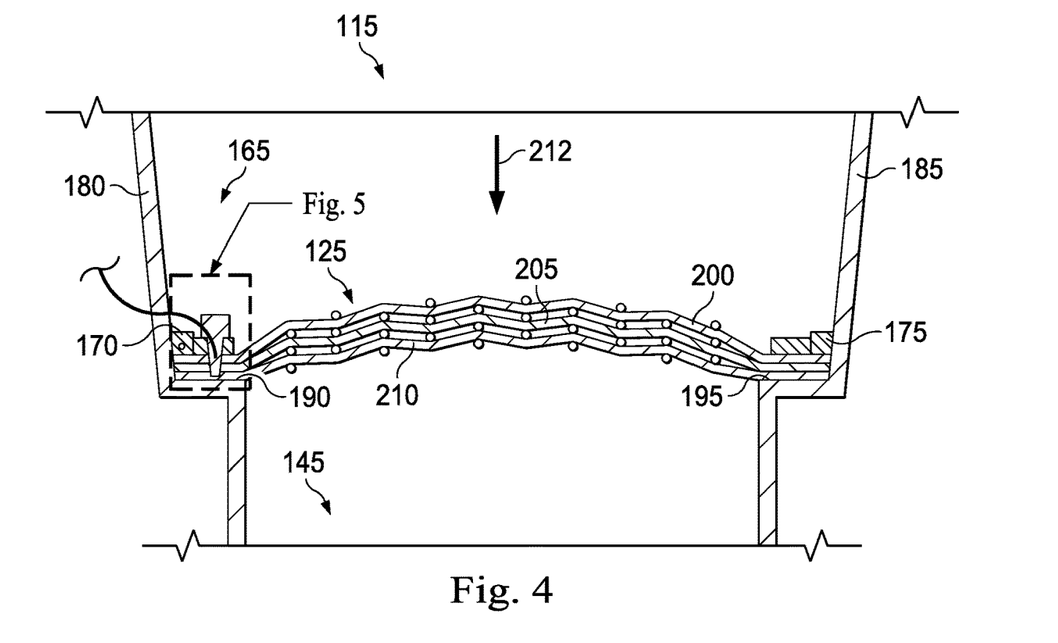
FIG. 4 is a sectional view of a portion of the vibratory screening machine of FIG. 2, according to an example embodiment.

FIG. 4 is a cross-sectional view of an illustration of a portion of the shale shaker 115 that shows the screen panel assembly 125 that is secured to the shaker basket assembly 130 via a screen tensioning assembly 165. The screen tensioning assembly 165 includes clamps 170, 175 mounted on sidewalls 180, 185, respectively of the shaker basket assembly 130. Generally, the clamps 170, 175 trap the screen panel assembly 125 against shoulders or grooves 190, 195 and above the return pits 145. However, in other embodiments, the tensioning assembly 165 retains the screen panel assembly 125 by clamping or tensioning mechanisms that are activated by electrical, hydraulic, pneumatic, or mechanical systems. A variety of tensioning assemblies 165 are contemplated here.

Generally, the screen panel assembly 125 includes layers of screens. As illustrated, the screen panel assembly 125 includes a first screen 200, a second screen 205, and a third screen 210. Often, the level of filtration for the first screen 200, the second screen 205, and the third screen 210 increases such that the smaller sized particles are capable of passing through the first screen 200 but are screened via either the second screen 205 and/or the third screen 210. However, in some embodiments, the third screen 210 has level of filtration that less than the second screen 205 and is configured to provide structural support to each of the first and second screens 200 and 205. While the screens 200, 205, 210 are stacked vertically, as layers, with the direction of fluid flow therethrough being depicted by the arrow 212 in FIG. 3, the screens 200, 205, and 210 are capable of being arranged in a variety of configurations designed for fluid flow across each screen 200, 205, and 210. For example, in some embodiments, multiple screen panel assemblies 125 may be may be positioned relative to each other along the direction depicted by the arrow 213 in FIG. 3. In some configurations, the level of filtration of the screens 200, 205, 210 may be different for each screen panel assembly 125, such that the filtration changes as the solids cross the screen panel assemblies 125 and 125' in the shale shaker 115. While three screens are illustrated in FIGS. 3 and 4, any number of screens, including only 1 screen is contemplated here.

In some embodiments, the screen tensioning assembly 165, including clamps 170, 175, applies an electric current to one or more of the screens (e.g., 200, 205, and 210) to electroseparate solids, such as the low-gravity solids, from the returned drilling fluids at the shale shaker 115. In some embodiments, the separate shaker screens layers 200, 205 and 210 may be configured as electrodes such that the screens act as a surface for electroseparation, including electrophoresis, electromagnetic attraction, or electrocoagulation, of cuttings solids, including low gravity solids.

In some embodiments, the first screen 200 and the third screen 210 include a metallic material. In other embodiments, the first and third screens 200 and 210 are formed from or with composite materials or are coated in a metallic or conductive material. Moreover, in some embodiments, the first and/or third screens 200 and 210 are constructed of a material that emits heat when a current is applied. In some embodiments, the first screen 200 and/or the third screen 210 is composed of a material that is a non-sacrificial electrode metal. That is, each of the first and third screen 200 and 210 is constructed of materials that maintain integrity or mass when a current is applied. However, in other embodiments, the screen panel assembly 125 is configured such that one of the screens 200, 205, and/or 210 is a sacrificial electrode. In some embodiments and to maintain screen integrity and physical filtering, the screen 200 is a sacrificial electrode. The sacrificial electrode may be determined to be the anode or cathode depending on the properties of the returned drilling fluid or downhole fluid.

In some embodiments, the second screen 205 is positioned between the first and third screens 200 and 210 and includes an insulator, an insulating material, and/or a non-conductive coating to prevent contact, arcing, or shorting between the first screen 200 and the third screen 210. Alternatively, the first screen 200, the second screen second 205, and the third screen 210 are electrodes.

Generally, clamps 170, 175 of the screen tensioning assembly act as electric current supplies to the screen panel assembly 125. Clamps 170, 175 may directly supply electric current to screen panel assembly 125, for example through contact, and in some instances clamping contact with first screen 200 and third screen 210.

Figure 5:
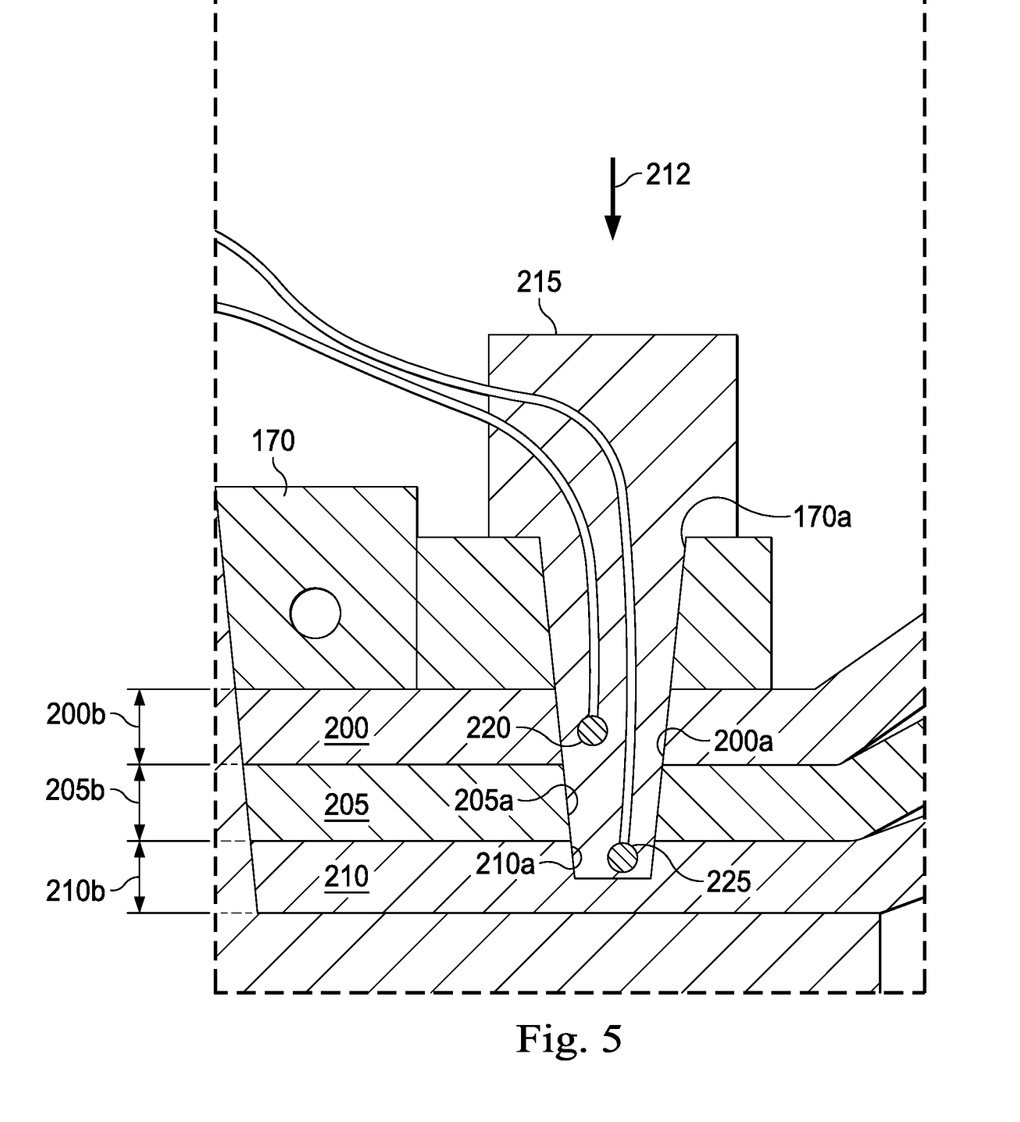
FIG. 5 is an enlarged view of the FIG. 4, according to an example embodiment.

FIG. 5 is an enlarged view of a portion of FIG. 4. In some embodiments, an aperture or opening 200a is formed in the first screen 200, an aperture 205a is formed in the second screen 205, and an aperture 210a is formed in the third screen 210. As illustrated, the apertures 200a, 205a, and 210a are aligned. Moreover, an aperture 170a is formed through the clamp 170 and the aperture 170a is aligned with the apertures 200a, 205a, and 210a. A longitudinally-extending plug 215 that is sized to extend within each of the apertures 170a, 200a, 205a, and 210a is accommodated within the apertures 170a, 200a, 205a, 210a. In some embodiments, a first electrical contact 220 is located or formed on an external surface of a plug 215 at a first position and a second electrical contact 225 is located on the external surface at a second position that is spaced from the first position. In some embodiments, the plug 215 forms a portion of the tensioning assembly 165 and is electrically coupled to the electrical control panel 160 or is otherwise configured to apply one or more electric currents. Generally, each of the screens 200, 205, and 210 have a thickness 200b, 205b, and 210b, respectively, that is defined along the direction 212. In some embodiments, each of the thicknesses 200b, 205b, and 210b are different. Generally, the thickness 205b is dependent upon the material comprising the screen 205 and is sized to prevent arcing between the first and third screens 200 and 210. While the screens 200, 205, and 210 are illustrated as in direct contact, in some embodiments a gap is formed between the screens 200 and 205 and/or the screens 205 and 210. In some embodiments, an o-ring or other elastomeric seal is positioned within one of the apertures 200a, 205a, 210a or forms a portion of one of the apertures 200a, 205a, 210a. In other embodiments, an o-ring or other insulating seal is positioned between the screens 200 and 205 and/or the screens 205 and 210. Generally, the o-ring or other insulating seal cleans the plug 215 so that an electrical connection is sufficiently formed between the plug 215 and the screen 200 and optionally between the plug 215 and the screen 210.

Figure 6:
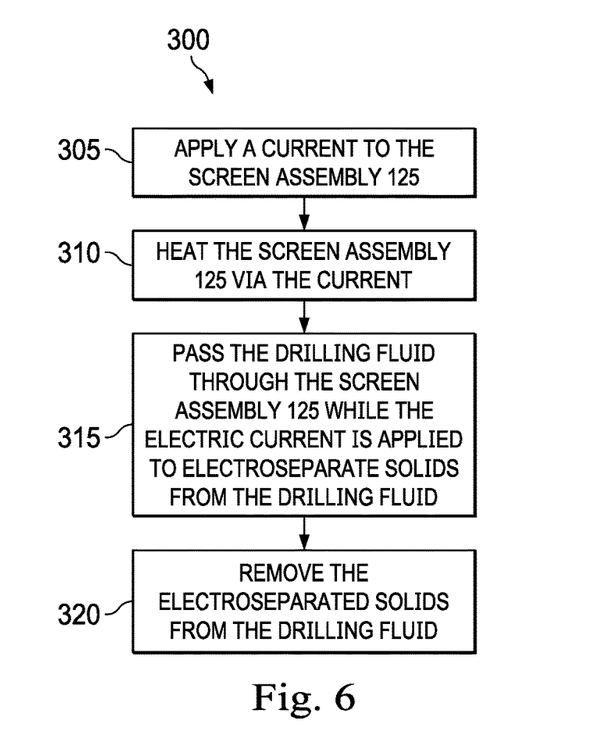
FIG. 6 is a flow chart illustration of a method of operating the apparatus of FIGS. 1-5, according to an example embodiment.

In an example embodiment, as illustrated in FIG. 6 with continuing reference to FIGS. 1-5, a method 300 method of removing solids from a drilling fluid includes applying a current to the screen panel assembly 125 at step 305; heating the screen panel assembly 125 via the current at step 310; passing the drilling fluid through the screen panel assembly 125 while the electric current is applied to electroseparate solids from the drilling fluid at step 315; and removing the electroseparated solids from the drilling fluid at step 320.

At the step 305, an electric current is applied to the screen panel assembly 125. In some embodiments, a first electric current is applied to the first screen 200 while a second electric current is applied to the third screen 210. However, in some embodiments only the first electric current is applied to the first screen 200. In some embodiments and as the second screen 205 is composed of an insulating material, the step 305 also includes insulating the first electric current from the second electric current via the second screen 205. In some embodiments, the first electric current is one of a positive current and a negative current; and the second electric current is the other of the positive current and the negative current. In some embodiments, applying the electric current to the screen panel assembly 125 includes fitting the plug 215 within the openings 170a, 200a, 205a, 210a to align the first screen 200 with the first electrical contact 220 to apply the first current to the first screen 200 and to align the third screen 210 with the second electrical contact 225 to apply the second current to the third screen 210.

At the step 310, the screen panel assembly 125 is heated. In some embodiments, applying the first electric current to the first screen 200 and applying the second electric current to the third screen 210 results in each of the first and third screen 200 and 210 being heated. Additional, heating of the drilling fluid reduces viscosity and thus aids in the removal of solids from the drilling fluid.

At the step 315, the drilling fluid is passed through the screen panel assembly 125 while the electric current is being applied to the screen panel assembly 125 to electroseparate solids from the drilling fluid. That is, during operation, the returned drilling fluid and cuttings slurry is delivered to feed box assembly 135 and/or directly onto the screens of the screen assembly 125. As the drilling fluid passes through the screen panel assembly 125 and when current is applied to the first screen 200, the solids are removed or at least separated from the drilling fluid via electro-coagulation. In some embodiments and when the first screen 200 includes a magnetic material, the solids are removed or at least separated from the drilling fluid via electromagnetic agglomeration. In some embodiments and when electric current is applied to both the first and third screens 200 and 210, the solids are removed or at least separated from the drilling fluid via electrophoresis. Generally, the drilling fluid acts as an electrical conductor between the first screen 200 and the third screen 210 and a carrier fluid for the low gravity solids. As there is a relatively small dimension of space between the first and third screens 200 and 210, there is a short distance electrophoretic gradient established between them. Altering the current applied to the screen panel assembly 125 may change the magnitude of that gradient. Depending on the fluid properties of the drilling fluid, one of the first screen 200 and the third screen 210 becomes anodic and the other of the first screen 200 and the third screen 210 becomes cathodic. In some embodiments and in electroseparation, electromagnetic, or electrophoretic configurations, the first and the third screens 200 and 210 are not sacrificial electrodes. In some embodiments and in electrocoagulation configurations, the screens 200 and 210 are composed of non-sacrificial electrode metals. Moreover, as the screens 200 and 210 are heated in some embodiments when the drilling fluid passes through the screen panel assembly 125, the drilling fluid is heated as it passes over the heated screens 200 and 210. In other applications, heating the screens 200 and 210, and thus the drilling fluid, is not needed and omitted from the method 300. Generally, the step 315 also includes vibrating the screen panel assembly 125.

At the step 320, the electroseparated solids are removed from the drilling fluid. In some embodiments, the coagulated particles may be screened at the shaker 115 (e.g., discharged over the discharge skirt 150 or retained by one or more of the screens 200, 205, and 210) or removed downstream (e.g. flocculation) in the drilling fluid recycle process. In some embodiments and depending on the electrostatic charges in the solids, the drilling fluid, and between the solids and the fluid, the solids will interact with each other and agglomerate on the electrode layers of the screen(s) 200 and/or 210. In some embodiments and in electrocoagulation configurations, the solids will coagulate on ions of the sacrificial anode, if not on the electrode itself. As such, in some embodiments the solids will accumulate on one or more of the screens 200, 205, and 210. In instances, agglomerated solids may blind or block off fluid flow through the screen panel assembly 125. In some embodiments, the current as applied to the screens 200, 205, 210 may be reversed to electrostatically repel or repulse agglomerated solids, convey agglomerated solids to shaker skirt 150, and reduce blinding.

In some embodiments, the method 300 further includes removing the plug 215 from the apertures 170a, 200a, 205a, and 210a, which occurs prior to or during release of the tensioning assembly 165. Thus, each or every of the screens 200, 205, and 210 is capable of being replaced.

Generally, electroseparation, electromagnetic, electrophoresis, and electrocoagulation require a direct current (DC). The shaker 115 is configured to deliver a direct current to the first screen 200 and an opposite direct, or ground, current to the third screen 210. Often, shakers are conventionally powered by an alternating current. Thus, the shaker 115 may include an AC to DC converter. In some embodiments, the shaker 115 includes alternating current electrodes to provide electric current(s) to the screen panel assembly 125.

In some embodiments, the current to the shaker screen panel assembly 125 is controlled by the same circuit that otherwise controls operation of the shaker screen panel assembly 125 so that a current cannot be applied to the screen panel assembly 125 without the screen panel assembly 125 being vibrated.

In some embodiments, the screens 200, 205, and 210 are easily accessible by an operator to allow for replacement of any one or more of the screens 200, 205, and 210. In other embodiments, the mesh size, screen size, passages or pores that define the filtering level of the screens 200, 205, and 210 are larger than previously used to account for the agglomeration of low gravity solids on the screens 200, 205, and 210 to prevent screen blinding.

The shale shaker 115 is capable of being modified in a variety of ways. For example, delivery of the electric current to the screen panel assembly 125 is not limited to the plug 215. For example, a first plug or contact is electrically coupled to the first screen 200 and a second plug or contact that is different from the first plug is electrically coupled to the third screen 210. The electric current may be supplied to the first and third screen 200 and 210 via any tensioning mechanism or coupler that secures the screens 200 and 210 to the walls 180 and 185 of the shaker 115. In some embodiments, the shaker screens 200 and 210 are configured such that there are electrode wires that extend through the screen elements, rather than the complete screen element 200 and 210 acting as the electrode. In some embodiments, the shaker screen panel assembly 125 has multiple component panels that define the total screening surface area. In some configurations, alternating panels in a shaker panel screen assembly 125 may be configured as an electrode, such that only a portion of the screening surface area is charged. That is, any number of screens can be arranged along the direction 212 and/or 213, with electric current being applied to any one or more of the screens. Additionally, the second (middle) screen element, may be configured as a sacrificial anode. In some embodiments, the shaker 115 is configured such that the walls or other elements of the feed box assembly 135, the, return pits 145, or flow control gates are configured as electrodes for electrocoagulation and/or heaters.

In some embodiments and when additional heating capacity is needed, the shaker 115 may be configured such that an active or passive heating assembly is disposed above the shaker basket assembly 130 or on the vibration assembly 140. Passive heating assemblies include heat or infrared lamps. An active heating assembly includes a heating element in a fan, jet, or other devices capable of delivering a heated air to the shaker basket assembly 130. In this configuration, the hot air jet heats the shaker basket assembly 130, as well as heats and motivates (blows) the drilling fluid off of the cuttings and low gravity solids agglomerated on the screens 200, 205, and/or 210.

In some embodiments, the shale shaker 115 and/or the method 300 addresses the challenges of removing low gravity solids from a returned drilling fluid as soon as the fluid returns to the surface. Specifically, the shale shaker 115 improves the removal of low-gravity solids when the drilling fluid is an oil based fluids. In some embodiments, shale shaker 115 improves the shaker contribution to the reduction of low gravity solids in returned drilling fluids for recycle. Additionally, it may begin the process of thermal treatment of the cuttings to remove drilling fluid by volatilization and viscosity reduction. In turn it may improve centrifuge and hydrocyclone operations downstream in the drilling fluid recycling process.

The disclosure is not limited to the shale shaker 115 and the application of electric current to a screen assembly is applicable to any vibratory screening machine. That is, the application of an electric current to a portion of a screen assembly to separate solids from a fluid, such as a treatment fluid, drilling fluid, or other fluid, using a screen assembly is contemplated here.

Thus, a method of removing solids from a fluid has been described. Embodiments of the method may generally include applying a first electric current to a first screen of a screen assembly within a vibratory screening machine; passing the fluid through the screen assembly while the first electric current is applied to allow electroseparation of solids within the fluid; and removing the electroseparated solids from the fluid. Any of the foregoing embodiments may include any one of the following elements, alone or in combination with each other:

The fluid is a drilling fluid.
The electroseparation is electro-coagulation.
The first screen includes a magnetic material; and the electroseparation is electromagnetic agglomeration.
Applying a second electric current to a second screen of the screen assembly while the first electric current is being applied to the first screen; and wherein passing the fluid through the screen assembly comprises passing the fluid through the screen assembly while the second electric current is being applied.
The first electric current is one of a positive current and a negative current; and the second electric current is the other of the positive current and the negative current.
The electroseparation is electrophoresis.
Insulating the first electric current from the second electric current using a third screen positioned between the first screen and the third screen.
Solids within the fluid agglomerate on one at least one of the first screen and the second screen.
The fluid acts as an electrical conductor between the first screen and the second screen.

Applying the first electric current to the first screen heats the first screen; wherein applying the second electric current to the second screen heats the second screen; and wherein passing the fluid through the first and second screens comprises heating the fluid.

When the first electric current is applied to the first screen, the first screen is one of an anode and a cathode; and wherein, when the second electric current is applied to the second screen, the second screen is the other of the anode and the cathode.

Vibrating the screen assembly; and screening the electroseparated solids, using the screen assembly, from the fluid.

Each of the first screen, the second screen, and the third screen are positioned such that an aperture formed in each of the first, second, and third screens are aligned.

Applying the first electric current to the first screen and applying the second electric current to the second screen of the screen assembly comprises fitting a plug within the aligned apertures.

The plug has an external surface that forms a first electrical contact and a second electrical contact that is longitudinally spaced from the first electrical contact.

Fitting the plug within the aligned apertures aligns the first screen with the first electrical contact to apply the first current to the first screen and aligns the second screen with the second electrical contact to apply the second current to the second screen.

Thus, a vibratory screening machine has been described. Embodiments of the machine may generally include a screen assembly extending between of the two opposing side walls; and a tensioning assembly securing the screen assembly to each of the two opposing side walls; wherein the screen assembly comprises a first screen; and wherein the tensioning assembly comprises a first electrical contact that applies a first electric current to the first screen. Any of the foregoing embodiments may include any one of the following elements, alone or in combination with each other:

The screen assembly further includes a second screen; and a third screen extending between the first screen and the second screen.

The first screen and the second screen include metal.

The third screen includes an insulator.

The tensioning assembly further comprises a second electrical contact that applies a second electric current to the second screen.

The tensioning assembly further comprises a longitudinally-extending plug.

The first electrical contact is located on an external surface at a first position along the longitudinally-extending plug.

The second electrical contact is located on the external surface at a second position along the longitudinally extending plug that is spaced from the first position.

Each of the first screen, the second screen, and the third screen are positioned such that an aperture formed in each of the first, second, and third screens are aligned.

The plug extends within the aligned apertures such that the first electrical contact applies the first electric current to the first screen and the second electrical contact applies the second electric current to the second screen.

The tensioning assembly further comprises a clamp that secures the first, second, and third screens to one of the two opposing side walls.

The clamp comprises an aperture sized to align with the apertures of the first, second, and third screens.

The plug further extends through the aperture of the clamp.

The first electric current is one of a positive current and a negative current.

The second electric current is the other of the positive current and the negative current.

The screen assembly is configured to receive a fluid; wherein the fluid acts as an electrical conductor between the first screen and the second screen.

The foregoing description and FIGS. are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

In several example embodiments, while different steps, processes, and procedures are described as appearing as distinct acts, one or more of the steps, one or more of the processes, and/or one or more of the procedures could also be performed in different orders, simultaneously and/or sequentially. In several example embodiments, the steps, processes and/or procedures could be merged into one or more steps, processes and/or procedures.

It is understood that variations may be made in the foregoing without departing from the scope of the disclosure. Furthermore, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

Illustrative embodiments and related methods of the present disclosure are described below as they might be employed in a pressure actuated inflow control device. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

What is claimed is:

1. A method of removing solids from a fluid, the method comprising:
   applying a first electric current to a first screen of a screen assembly within a vibratory screening machine;
   passing the fluid through the screen assembly while the first electric current is applied to allow electroseparation of solids within the fluid;
   removing the electroseparated solids from the fluid;
   applying a second electric current to a second screen of the screen assembly while the first electric current is being applied to the first screen; and
   wherein passing the fluid through the screen assembly comprises passing the fluid through the screen assembly while the second electric current is being applied.

2. The method of claim 1, wherein the fluid is a drilling fluid; and wherein the electroseparation is electro-coagulation.

3. The method of claim 1,
   wherein the first screen includes a magnetic material; and
   wherein the electroseparation is electromagnetic agglomeration.

4. The method of claim 1,
   wherein the first electric current is one of a positive current and a negative current; and
   wherein the second electric current is the other of the positive current and the negative current.

5. The method of claim 4, wherein the electroseparation is electrophoresis.

6. The method of claim 4, further comprising insulating the first electric current from the second electric current using a third screen positioned between the first screen and the second screen.

7. The method of claim 1, wherein solids within the fluid agglomerate on at least one of the first screen and the second screen.

8. The method of claim 1, wherein the fluid acts as an electrical conductor between the first screen and the second screen.

9. The method of claim 1,
   wherein applying the first electric current to the first screen heats the first screen;
   wherein applying the second electric current to the second screen heats the second screen; and
   wherein passing the fluid through the first and second screens comprises heating the fluid.

10. The method of claim 1,
    wherein, when the first electric current is applied to the first screen, the first screen is one of an anode and a cathode; and
    wherein, when the second electric current is applied to the second screen, the second screen is the other of the anode and the cathode.

11. The method of claim 1, further comprising:
    vibrating the screen assembly; and
    screening the electroseparated solids, using the screen assembly, from the fluid.

12. The method of claim 6,
    wherein each of the first screen, the second screen, and the third screen are positioned such that an aperture formed in each of the first, second, and third screens are aligned;
    wherein applying the first electric current to the first screen and applying the second electric current to the second screen of the screen assembly comprises fitting a plug within the aligned apertures;
    wherein the plug has an external surface that forms a first electrical contact and a second electrical contact that is longitudinally spaced from the first electrical contact; and
    wherein fitting the plug within the aligned apertures aligns the first screen with the first electrical contact to apply the first current to the first screen and aligns the second screen with the second electrical contact to apply the second current to the second screen.

13. A vibratory screening machine comprising:
    two opposing side walls;
    a screen assembly extending between the two opposing side walls; and
    a tensioning assembly securing the screen assembly adjacent each of the two opposing side walls;
    wherein the screen assembly comprises a first screen; and
    wherein the tensioning assembly comprises a first clamp disposed adjacent one side wall and clamping a first edge of the first screen and a second clamp spaced apart from the first clamp and disposed adjacent the other side wall and clamping a second edge of the first screen, where one of the clamps is an electrically conductive clamp disposed to apply a first electric current to the first screen.

14. A vibratory screening machine comprising:
    two opposing side walls;
    a screen assembly extending between the two opposing side walls; and
    a tensioning assembly securing the screen assembly to each of the two opposing side walls;
    wherein the screen assembly comprises a first screen;
    a second screen; and
    a third screen extending between the first screen and the second screen;
    wherein the first screen and the second screen include metal; and
    wherein the third screen includes an insulator; and
    a first electrical contact that applies a first electric current to the first screen;
    a second electrical contact that applies a second electric current to the second screen.

15. The vibratory screening machine of claim 14,
    wherein the tensioning assembly further comprises a longitudinally-extending plug;
    wherein the first electrical contact is located on an external surface at a first position along the longitudinally-extending plug; and
    wherein the second electrical contact is located on the external surface at a second position along the longitudinally extending plug that is spaced from the first position.

16. The vibratory screening machine of claim 15,
wherein each of the first screen, the second screen, and the third screen are positioned such that an aperture formed in each of the first, second, and third screens are aligned; and
wherein the longitudinally-extending plug extends within the aligned apertures such that the first electrical contact applies the first electric current to the first screen and the second electrical contact applies the second electric current to the second screen.

17. The vibratory screening machine of claim 16,
wherein the tensioning assembly further comprises a clamp that secures the first, second, and third screens to one of the two opposing side walls;
wherein the clamp comprises an aperture sized to align with the apertures of the first, second, and third screens; and
wherein the longitudinally-extending plug further extends through the aperture of the clamp.

18. The vibratory screening machine of claim 14,
wherein the first electric current is one of a positive current and a negative current; and
wherein the second electric current is the other of the positive current and the negative current.

19. A vibratory screening machine comprising:
two opposing side walls;
a screen assembly extending between the two opposing side walls; and
a tensioning assembly securing the screen assembly to each of the two opposing side walls;
wherein the screen assembly comprises a first screen and a second screen; and
wherein the tensioning assembly comprises a first clamp disposed adjacent one side wall and clamping a first edge of each of the first and second screens and a second clamp spaced apart from the first clamp and disposed adjacent the other side wall and clamping a second edge of each of the first and second screens, and a first electrical contact that applies a first electric current to the first screen, wherein the screen assembly is configured to receive a drilling fluid;
wherein the drilling fluid acts as an electrical conductor between the first screen and the second screen.

* * * * *